United States Patent
Kannan et al.

(10) Patent No.: US 9,961,135 B2
(45) Date of Patent: *May 1, 2018

(54) SYSTEM AND METHOD TO BALANCE SERVERS BASED ON SERVER LOAD STATUS

(71) Applicant: A10 Networks, Inc., San Jose, CA (US)

(72) Inventors: Lalgudi Narayanan Kannan, Los Altos, CA (US); Ronald Wai Lun Szeto, San Francisco, CA (US); Lee Chen, Saratoga, CA (US); Feilong Xu, San Jose, CA (US); Rajkumar Jalan, Saratoga, CA (US)

(73) Assignee: A10 NETWORKS, INC., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/956,230

(22) Filed: Dec. 1, 2015

(65) Prior Publication Data

US 2016/0088074 A1    Mar. 24, 2016

Related U.S. Application Data

(63) Continuation of application No. 12/894,142, filed on Sep. 30, 2010, now Pat. No. 9,215,275.

(51) Int. Cl.
*H04L 12/701* (2013.01)
*H04L 29/08* (2006.01)

(52) U.S. Cl.
CPC .......... *H04L 67/1008* (2013.01); *H04L 67/02* (2013.01); *H04L 67/1002* (2013.01)

(58) Field of Classification Search
CPC .. H04L 67/1008; H04L 67/02; H04L 67/1002
See application file for complete search history.

(56) References Cited

U.S. PATENT DOCUMENTS 5,218,602 A   6/1993   Grant et al.
5,774,660 A   6/1998   Brendel et al.
(Continued)

FOREIGN PATENT DOCUMENTS

CN   1372662 A   10/2002
CN   1449618 A   10/2003
(Continued)

OTHER PUBLICATIONS

Koike et al., "Transport Middleware for Network-Based Control," IEICE Technical Report, Jun. 22, 2000, vol. 100, No. 53, pp. 13-18.
(Continued)

*Primary Examiner* — Scott B Christensen
(74) *Attorney, Agent, or Firm* — AMPACC Law Group, LLP; Keith Kline

(57) ABSTRACT

A method, system, and computer program product for balancing servers based on server load status, include: receiving from a server a service response to a service request, the service response including a result from a processing of the service request and a server status indicating a computing load status of the server; obtaining the server status from the service response; receiving a next service request from a host, the next service request comprising a Uniform Resource Locator (URL); determining that the server is configured to process the URL; determining whether the server status indicates that the server is available to process the next service request; and in response to determining that the server status indicates that the server is available to process the next service request, sending the next service request to the server.

20 Claims, 7 Drawing Sheets

(56) References Cited

U.S. PATENT DOCUMENTS

| | | | |
|---|---|---|---|
| 5,935,207 A | 8/1999 | Logue et al. |
| 5,958,053 A | 9/1999 | Denker |
| 5,995,981 A | 11/1999 | Wikstrom |
| 6,003,069 A | 12/1999 | Cavill |
| 6,047,268 A | 4/2000 | Bartoli et al. |
| 6,131,163 A | 10/2000 | Wiegel |
| 6,219,706 B1 | 4/2001 | Fan et al. |
| 6,259,705 B1 | 7/2001 | Takahashi et al. |
| 6,321,338 B1 | 11/2001 | Porras et al. |
| 6,374,300 B2 | 4/2002 | Masters |
| 6,459,682 B1 | 10/2002 | Ellesson et al. |
| 6,587,866 B1 | 7/2003 | Modi et al. |
| 6,748,414 B1 | 6/2004 | Boumas |
| 6,772,334 B1 | 8/2004 | Glawitsch |
| 6,779,017 B1 | 8/2004 | Lamberton et al. |
| 6,779,033 B1 | 8/2004 | Watson et al. |
| 6,801,949 B1 * | 10/2004 | Bruck ............... H04L 29/12009 709/232 |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,167,927 B2 | 1/2007 | Philbrick et al. |
| 7,181,524 B1 | 2/2007 | Lele |
| 7,218,722 B1 | 5/2007 | Turner et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,739,395 B1 | 6/2010 | Parlamas et al. |
| 7,747,748 B2 | 6/2010 | Allen |
| 7,751,409 B1 | 7/2010 | Carolan |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,965,727 B2 | 6/2011 | Sakata et al. |
| 7,970,934 B1 | 6/2011 | Patel |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,090,866 B1 | 1/2012 | Bashyam et al. |
| 8,099,492 B2 | 1/2012 | Dahlin et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 2001/0049741 A1 | 12/2001 | Skene et al. |
| 2002/0032777 A1 | 3/2002 | Kawata et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0065762 A1 | 4/2003 | Stolorz et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |

(56) References Cited

U.S. PATENT DOCUMENTS

| | | |
|---|---|---|
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0289231 A1 | 12/2005 | Harada et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0127381 A1* | 6/2007 | Oh ................. G08G 1/0104 370/235 |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0195792 A1 | 8/2007 | Chen et al. |
| 2007/0203890 A1* | 8/2007 | Sareen ............. G06F 17/30902 |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0205310 A1 | 8/2010 | Altshuler et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0228878 A1 | 9/2010 | Xu et al. |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0060840 A1 | 3/2011 | Susai et al. |
| 2011/0093522 A1 | 4/2011 | Chen et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1 | 1/2012 | Shen et al. |

(56) References Cited

U.S. PATENT DOCUMENTS

| | | |
|---|---|---|
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0250770 A1 | 9/2013 | Zou et al. |
| 2013/0258846 A1 | 10/2013 | Damola |
| 2013/0268646 A1 | 10/2013 | Doron et al. |
| 2013/0282791 A1 | 10/2013 | Kruglick |
| 2013/0336159 A1 | 12/2013 | Previdi et al. |
| 2014/0012972 A1 | 1/2014 | Han |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0226658 A1 | 8/2014 | Kakadia et al. |
| 2014/0235249 A1 | 8/2014 | Jeong et al. |
| 2014/0248914 A1 | 9/2014 | Aoyagi et al. |
| 2014/0258465 A1 | 9/2014 | Li |
| 2014/0258536 A1 | 9/2014 | Chong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0325649 A1 | 10/2014 | Zhang |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0039671 A1 | 2/2015 | Jalan et al. |
| 2015/0098333 A1 | 4/2015 | Lin et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0094470 A1 | 3/2016 | Skog |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0164792 A1 | 6/2016 | Oran |
| 2016/0173579 A1 | 6/2016 | Jalan et al. |

FOREIGN PATENT DOCUMENTS

| | | |
|---|---|---|
| CN | 1473300 A | 2/2004 |
| CN | 1529460 A | 9/2004 |
| CN | 1575582 A | 2/2005 |
| CN | 1714545 A | 12/2005 |
| CN | 1725702 A | 1/2006 |
| CN | 1910869 A | 2/2007 |
| CN | 101004740 A | 7/2007 |
| CN | 101094225 A | 12/2007 |
| CN | 101163336 A | 4/2008 |
| CN | 101169785 A | 4/2008 |
| CN | 101189598 A | 5/2008 |
| CN | 101193089 A | 6/2008 |
| CN | 101247349 A | 8/2008 |
| CN | 101261644 A | 9/2008 |
| CN | 101495993 A | 7/2009 |
| CN | 101878663 A | 11/2010 |
| CN | 102143075 A | 8/2011 |
| CN | 102546590 A | 7/2012 |
| CN | 102571742 A | 7/2012 |
| CN | 102577252 A | 7/2012 |
| CN | 102918801 A | 2/2013 |
| CN | 103533018 A | 1/2014 |
| CN | 103944954 A | 7/2014 |
| CN | 104040990 A | 9/2014 |
| CN | 104067569 A | 9/2014 |
| CN | 104106241 A | 10/2014 |
| CN | 104137491 A | 11/2014 |
| CN | 104796396 A | 7/2015 |
| CN | 102577252 B | 3/2016 |
| CN | 102918801 B | 5/2016 |
| CN | 102571742 B | 7/2016 |
| CN | 104067569 B | 2/2017 |
| EP | 1209876 A2 | 5/2002 |
| EP | 1770915 A1 | 4/2007 |
| EP | 1885096 A1 | 2/2008 |
| EP | 02296313 | 3/2011 |
| EP | 2577910 A2 | 4/2013 |
| EP | 2622795 A2 | 8/2013 |
| EP | 2647174 A2 | 10/2013 |
| EP | 2760170 A1 | 7/2014 |
| EP | 2772026 A1 | 9/2014 |
| EP | 2901308 A2 | 8/2015 |
| EP | 2772026 B1 | 2/2017 |
| HK | 1182560 | 11/2013 |
| HK | 1183569 | 12/2013 |
| HK | 1183996 | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A | 8/2015 |
| IN | 39/2015 | 9/2015 |
| IN | 261CHE2014 A | 7/2016 |
| IN | 1668CHENP2015 A | 7/2016 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |

(56) References Cited

FOREIGN PATENT DOCUMENTS

| | | | |
|---|---|---|---|
| JP | 2013528330 A | 7/2013 |
| JP | 2014504484 A | 2/2014 |
| JP | 2014143686 A | 8/2014 |
| JP | 2015507380 A | 3/2015 |
| JP | 5855663 B2 | 12/2015 |
| JP | 5906263 B2 | 4/2016 |
| JP | 5913609 B2 | 4/2016 |
| JP | 5946189 B2 | 6/2016 |
| JP | 5963766 B2 | 8/2016 |
| KR | 1020080008340 A | 1/2008 |
| KR | 100830413 B1 | 5/2008 |
| KR | 20130096624 A | 8/2013 |
| KR | 101576585 B1 | 12/2015 |
| KR | 101632187 B1 | 6/2016 |
| KR | 101692751 B1 | 1/2017 |
| WO | WO2001013228 | 2/2001 |
| WO | WO2001014990 | 3/2001 |
| WO | WO2001045349 | 6/2001 |
| WO | WO2003103237 | 12/2003 |
| WO | WO2004084085 A1 | 9/2004 |
| WO | WO2006098033 A1 | 9/2006 |
| WO | WO2008053954 A1 | 5/2008 |
| WO | WO2008078593 A1 | 7/2008 |
| WO | WO2011049770 A2 | 4/2011 |
| WO | WO2011079381 A1 | 7/2011 |
| WO | WO2011149796 A2 | 12/2011 |
| WO | WO2012050747 A2 | 4/2012 |
| WO | WO2012075237 A2 | 6/2012 |
| WO | WO2012083264 A2 | 6/2012 |
| WO | WO2012097015 A2 | 7/2012 |
| WO | WO2013070391 A1 | 5/2013 |
| WO | WO2013081952 A1 | 6/2013 |
| WO | WO2013096019 A1 | 6/2013 |
| WO | WO2013112492 A1 | 8/2013 |
| WO | WO2013189024 A1 | 12/2013 |
| WO | WO2014031046 A1 | 2/2014 |
| WO | WO2014052099 A2 | 4/2014 |
| WO | WO2014088741 A1 | 6/2014 |
| WO | WO2014093829 A1 | 6/2014 |
| WO | WO2014138483 A1 | 9/2014 |
| WO | WO2014144837 A1 | 9/2014 |
| WO | WO2014179753 A2 | 11/2014 |
| WO | WO2015153020 A1 | 10/2015 |

OTHER PUBLICATIONS

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.

"tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.

Cardellini et al., "Dynamic Load Balancing on Web-server Systems", IEEE Internet Computing, vol. 3, No. 3, pp. 28-39, May-Jun. 1999.

Spatscheck et al., "Optimizing TCP Forwarder Performance", IEEE/ACM Transactions on Networking, vol. 8, No. 2, Apr. 2000.

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Goldszmidt et al. NetDispatcher: A TCP Connection Router, IBM Research Report RC 20853, May 19, 1997.

\* cited by examiner

Server Status Values

0 – Not Busy
1 – Busy, cannot serve as secondary server
2 – Very Busy

SYSTEM AND METHOD TO BALANCE SERVERS BASED ON SERVER LOAD STATUS

CROSS-REFERENCE TO RELATED APPLICATIONS

This application is a continuation and claims the benefit of U.S. patent application Ser. No. 12/894,142, filed Sep. 30, 2010 and entitled "System and Method to Balance Servers Based on Server Load Status", now U.S. Pat. No. 9,215,275, issued Dec. 15, 2015. The disclosure of the above-referenced application is incorporated herein by reference in its entirety for all purposes.

BACKGROUND OF THE INVENTION

Field

This invention relates generally to data communications, and more specifically, to a method and system to service load balancers.

Background

Web services and cloud computing are deployed in an unprecedented pace. New servers are unloaded and installed at datacenters every day. Demands of web services and corporate computing come from all directions. Consumer oriented services include iPhone™ apps, mobile applications such as location based services, turn-by-turn navigation services, e-book services such as Kindle™, video applications such as YouTube™ or Hulu™, music applications such as Pandora™ or iTunes™, Internet television services such as Netflix™, and many other fast growing consumer Web services. On the corporate front, cloud computing based services such as Google™ docs, Microsoft™ Office Live and Sharepoint™ software, Salesforce.com™'s on-line software services, tele-presence and web conferencing services, and many other corporate cloud computing services.

As a result more and more servers are deployed to accommodate the increasing computing needs. Traditionally these servers are managed by server load balancers (SLB). SLB are typically network appliances, such as A10 Network's AX-Series traffic managers. SLB manage the load balancing of servers based on incoming service requests. Common methods to balance load among servers is to distribute the service requests based on the applications (HTTP, FTP, etc.), service addresses such as URL, priorities based on network interfaces or host IP addresses. SLB may distribute service requests additionally in a round robin fashion to the servers, assuming and ensuring the servers would be evenly loaded. However, different service requests have different service computing consequences. A server may be fully loaded with only a handful of service requests while another server remains mostly idle even with plenty of service requests. SLB may inappropriately send another request to a busy server, incorrectly considering the busy server being readily available, instead of sending the request to an idle server.

It would be beneficial if the SLB are aware of the computing load situation of a server so that SLB can better select a server to process a service request.

Therefore, there is a need for a system and method for a server load balancer to select a server based on the server load status.

BRIEF SUMMARY OF THE INVENTION

According to one embodiment of the present invention, a method for balancing servers based on server load status comprises: receiving from a server by a service gateway a service response to a service request, the service response comprising a result from a processing of the service request and a server status indicating a computing load status of the server; obtaining by the service gateway the server status from the service response; receiving a next service request from a host by the service gateway, the next service request comprising a Uniform Resource Locator (URL); determining by the service gateway that the server is configured to process the URL; determining by the service gateway whether the server status indicates that the server is available to process the next service request; and in response to determining that the server status indicates that the server is available to process the next service request, sending the next service request to the server by the service gateway.

In one aspect of the present invention, the method comprises: establishing a service session between the service gateway and the server; sending the service request to the server by the service gateway; and receiving from the server by the service gateway the service response, the service response comprising the result from the processing of the service request by the server and the server status indicating the computing load status of the server.

In one aspect of the present invention, the method comprises: obtaining by the service gateway the server status from the service response; modifying by the service gateway the service response by removing the server status from the service response; and sending the modified service response to a host which sent the service request by the service gateway.

In one aspect of the present invention, the method comprises: determining by the service gateway whether the server is configured to process the URL as a primary server or a secondary server; in response to determining that the server is configured to process the URL as the primary server, storing by the service gateway the next service request in a first buffer configured to store service requests to be processed by the server as the primary server; and in response to determining that the server is configured to process the URL as the secondary server, storing by the service gateway the next service request in a second buffer configured to store service requests to be processed by the server as the secondary server.

In one aspect of the present invention, where the server is determined to be configured to process the URL as the primary server, the method comprises: determining by the service gateway whether the server status indicates the server is available to process the service requests as the primary server; in response to determining that the server status indicates the server is available to process the service requests as the primary server, finding by the service gateway the next service request in the first buffer; and sending the next service request to the server by the service gateway.

In one aspect of the present invention, where the server is determined to be configured to process the URL as the secondary server, the method comprises: determining by the service gateway whether the server status indicates the server is available to process the service requests as the secondary server; in response to determining that the server status indicates the server is available to process the service requests as the secondary server, determining by the service gateway whether to select the server; in response to determining to select the server, finding the next service request in the second buffer by the service gateway; and sending the next service request to the server by the service gateway.

In one aspect of the present invention, the method comprises: determining by the service gateway that the server is configured to process service requests comprising a predetermined hashed value; applying by the service gateway a hashing function to the URL in the next service request; and determining by the service gateway that the hashed value of the URL matches the predetermined hashed value.

In one aspect of the present invention, the method comprises: determining by the service gateway that the server is configured to process the URL; determining by the service gateway a priority for the next service request based on a predetermined parameter for the next service request; storing by the service gateway the next service request in a buffer configured to store service requests with the determined priority; determining by the service gateway whether the server status indicates that the server is available to process the service requests; in response to determining that the server status indicates that the server is available to process the next service request, determining by the service gateway whether the server is to process service requests with the determined priority; in response to determining that the server is to process service requests with the determined priority, finding the next service request in the buffer configured to store service requests with the determined priority by the service gateway; and sending the next service request to the server by the service gateway.

System and computer program products corresponding to the above-summarized methods are also described and claimed herein.

BRIEF DESCRIPTION OF THE SEVERAL VIEWS OF THE FIGURES

FIG. 3 illustrates possible values for server status.

DETAILED DESCRIPTION OF THE INVENTION

Figure 1:
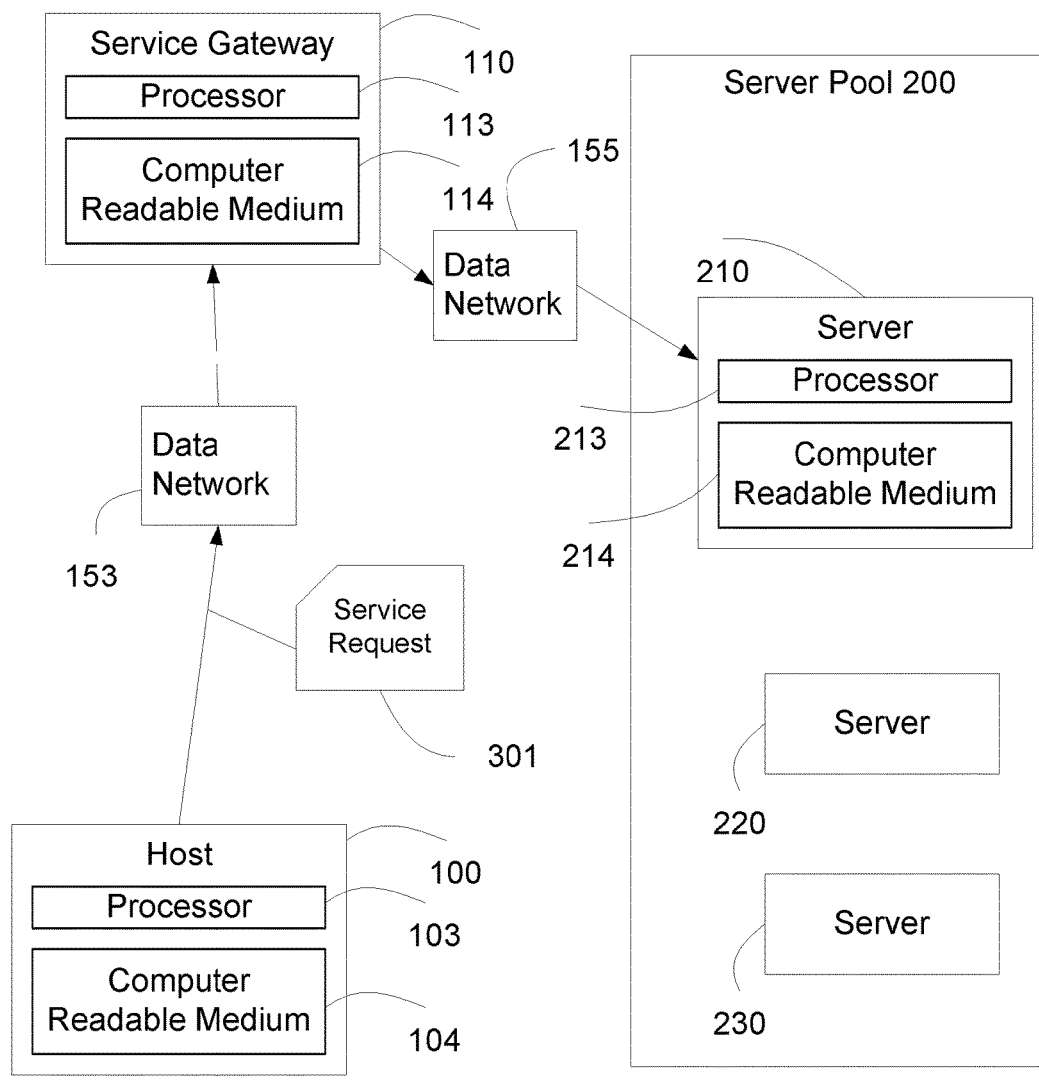
FIG. 1 illustrates an embodiment of a service gateway and an embodiment of the server pool according to the present invention.

The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an embodiment of the service gateway 110 and an embodiment of the server pool 200 according to the present invention. The service gateway 110 receives a service request 301 from a host 100. Service request 301 is delivered over a data network 153. In one embodiment, service request 301 is a Web service request such as an HTTP (Hypertext Transport Protocol) request, a secure HTTP request, an FTP (File Transfer Protocol) request, a file transfer request, an SIP (Session Initiation Protocol) session request, a request based on Web technology, a video or audio streaming request, a Web conferencing session request, or any request over the Internet or corporate network.

Host 100 is a computing device with network access capabilities. The host 100 is operationally coupled to a processor 103 and a computer readable medium 104. The computer readable medium 104 stores computer readable program code for implementing the various embodiments of the present invention as described herein. In one embodiment, host 100 is a workstation, a desktop personal computer or a laptop personal computer. In one embodiment, host 100 is a Personal Data Assistant (PDA), a smartphone, or a cellular phone. In one embodiment, host 100 is a set-top box, an Internet media viewer, an Internet media player, a smart sensor, a smart medical device, a net-top box, a networked television set, a networked DVR, a networked Blu-ray player, or a media center.

In one embodiment, data network 153 is an Internet Protocol (IP) network. In one embodiment, data network 153 is a corporate data network or a regional corporate data network. In one embodiment, data network 153 is an Internet service provider network. In one embodiment, data network 153 is a residential data network. In one embodiment, data network 153 includes a wired network such as Ethernet. In one embodiment, data network 153 includes a wireless network such as a WiFi network, or cellular network.

The service gateway 110 is operationally coupled to a processor 113 and a computer readable medium 114. The computer readable medium 114 stores computer readable program code, which when executed by the processor 113, implements the various embodiments of the present invention as described herein. In some embodiments, service gateway 110 is implemented as a server load balancer, an application delivery controller, a service delivery platform, a traffic manager, a security gateway, a component of a firewall system, a component of a virtual private network (VPN), a load balancer for video servers, or a gateway to distribute load to a plurality of servers.

Server pool 200 comprises a plurality of servers, for example server 210. Server 210 is operationally coupled to a processor 213 and a computer readable medium 214. The computer readable medium 214 stores computer readable program code, which when executed by the processor 213, implements the various embodiments of the present invention as described herein. In some embodiments, the computer readable program code implements server 210 as a Web server, a file server, a video server, a database server, an application server, a voice system, a conferencing server, a media gateway, an SIP server, a remote access server, a VPN server, or a media center.

In one embodiment, server pool 200 further includes server 220 and server 230. In an embodiment, server pool 200 is located in a datacenter, a server room, or an office. In an embodiment, the plurality of servers in server pool 200 may be located geographically over several locations or several datacenters. Service gateway 110 connects to server pool 200 via data network 155. In one embodiment, data network 155 is the same as data network 153. In one embodiment, data network 155 is different from data network 153. In one embodiment, host 100 does not have direct access to data network 155. In one embodiment, host 100 has direct access to data network 155.

Figure 2:
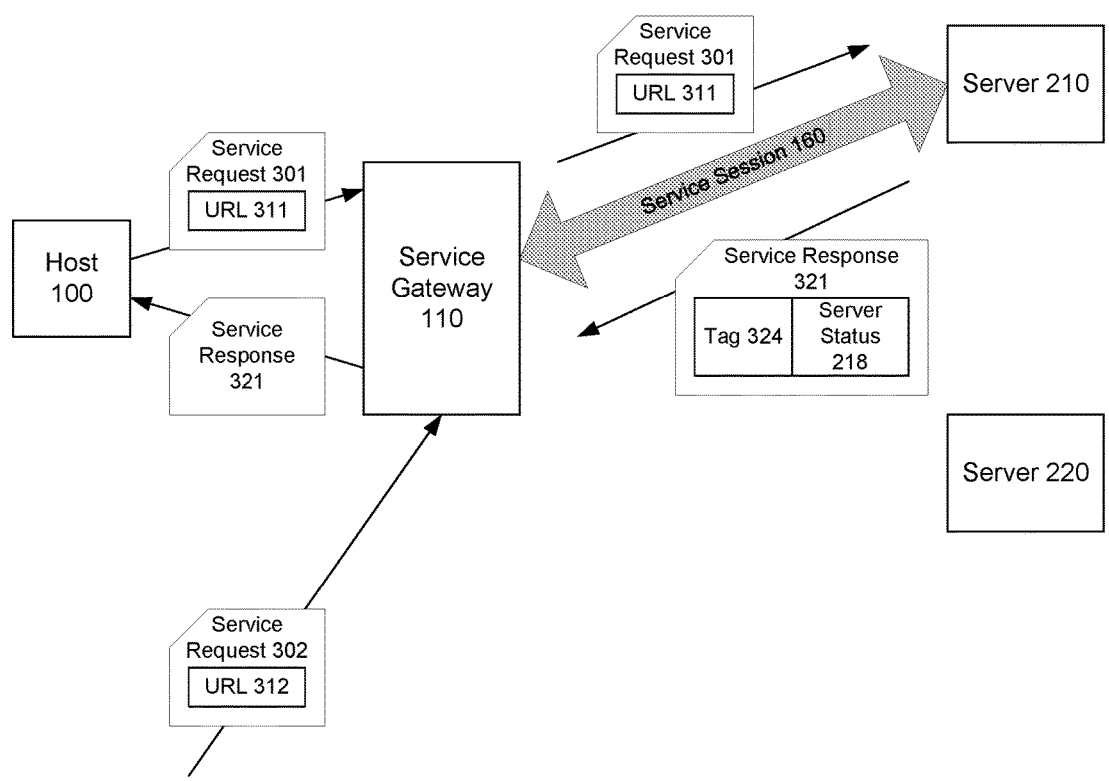
FIG. 2 is a block diagram illustrating an embodiment of the processing of service requests by the service gateway.

FIG. 2 is a block diagram illustrating an embodiment of the processing of service requests by the service gateway 110. Based on information in service request 301, service gateway 110 selects server 210 to process service request 301. In one embodiment, service request 301 includes a Universal Resource Location (URL) 311.

Service gateway 110 selects server 210 based on service request URL 311. Server pool 200 is configured to process service request 301 efficiently, by using service request URL 311. The servers in the server pool 200 are configured as primary servers for particular URL's, and as secondary servers for other URL's. In an embodiment, server 210 is configured as a primary server for URL 311, whereas server 220 is configured as a secondary server for URL 311. In this embodiment, service gateway 110 preferably selects server 210 to process service request 301 as server 210 is configured as the primary server for URL 311. Service gateway 110 may select server 220 under certain circumstances to process service request 301 as server 220 is configured as the secondary server for URL 311. In one embodiment, there is a second service request URL 312 corresponding to a second service request 302. Server 220 may be configured to process second service request 302 with request URL 312 as a primary server.

Figure 7:
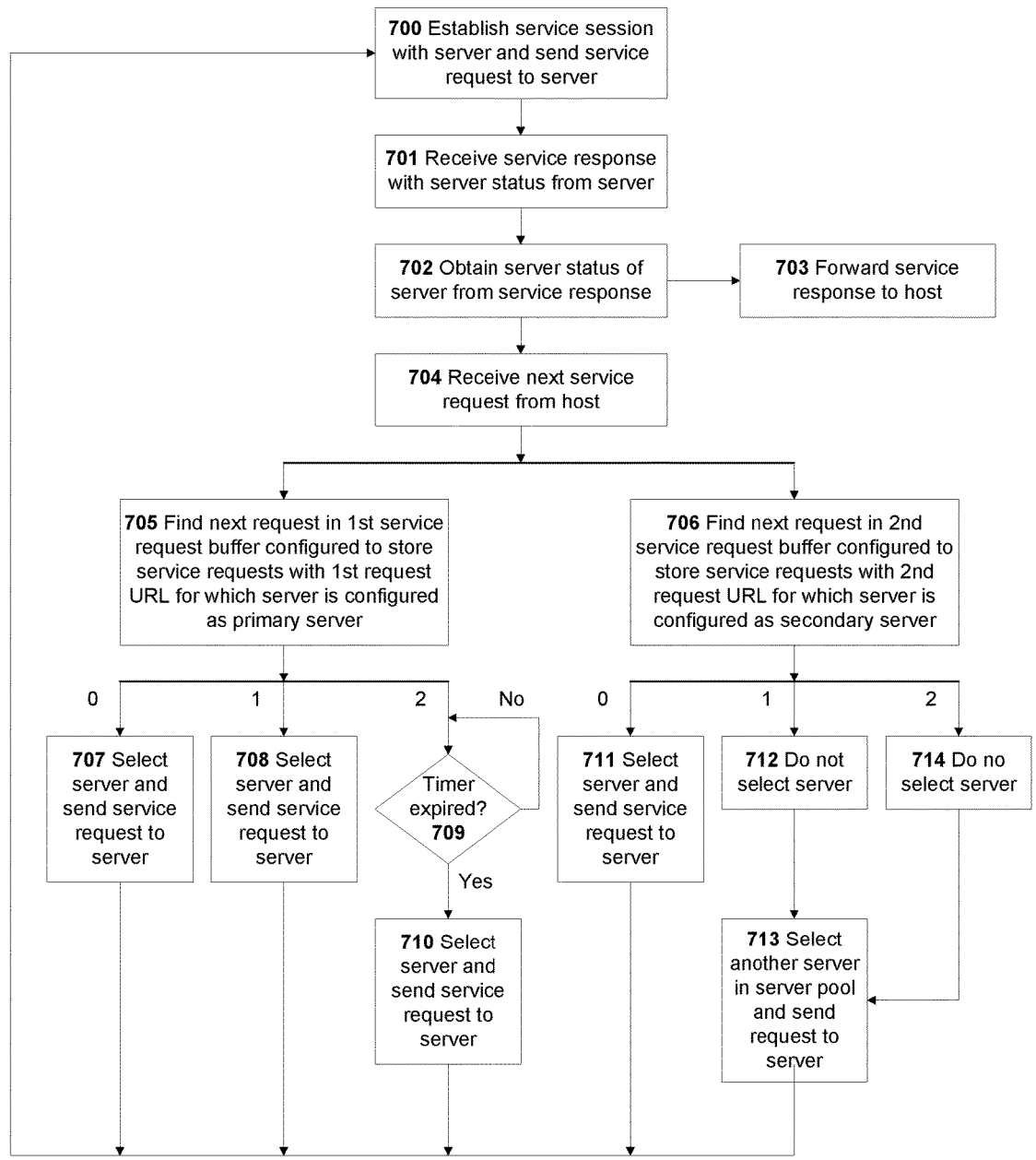
FIG. 7 is a flowchart illustrating an embodiment of the method for processing service requests by the service gateway.

FIG. 7 is a flowchart illustrating an embodiment of the method for processing service requests by the service gateway 110. Referring to both FIGS. 2 and 7, service gateway 110 establishes service session 160 with server 210 and sends service request 301 to server 210 (700). Upon processing service request 301, server 210 sends a service response 321 to service gateway 110 (701). Server 210 includes in the service response 321 a server status 218. Server status 218 indicates the availability or the computing load status of server 210. In one embodiment, server status 218 reflects a load representing CPU utilization, memory utilization, network utilization, storage utilization or a combination of one or more of the utilizations. In general, server status 218 summarizes how busy server 210 is.

Service gateway 110 obtains the server status 218 from the service response 321 (702) and relays the service response 321 to host 100 (703). In one embodiment, service gateway 110 modifies the service response 321 by removing server status 218 from service response 321. The service gateway 110 then sends the modified service response to host 100.

Service response 321 includes a result from the servicing of the service request 301. The service response 321 further includes the server status 218 associated with a tag 324. Service gateway 110 identifies the tag 324 from service response 321 and extracts server status 218 associated with tag 324. In one embodiment, service request 301 is an HTTP request, and service response 321 is an HTTP response. In this embodiment, tag 324 is in the HTTP header of the HTTP response. In one embodiment, service response 321 includes an HTML document. In this embodiment, tag 324 is an HTML tag. In another embodiment, service response 321 includes an XML document, and tag 324 can be an XML tag. In one embodiment, service response 321 is an SIP response packet, and tag 324 is an SIP tag. In one embodiment, service response 321 is an FTP response, and tag 324 is a special FTP reply code.

FIG. 3 illustrates possible values for server status 218. Other values for the server status 218 may be configured according to the needs of the system. In one embodiment, a value of 0 for server status 218 indicates that server 210 is not busy. Server 210 can handle new requests without any delay. For example, if service gateway 110 receives service request 301 with a request URL 311, service gateway 110 will select server 210 to process service request 301.

A value of 1 for server status 218 indicates that server 210 is busy. While server 210 can continue to serve as a primary server for URL 311, server 210 cannot serve as a secondary server. For example, server 210 is configured as a secondary server for URL 312. If service gateway 110 receives service request 302 with a request URL 312, service gateway 110 does not select server 210 to process service request 302.

A value of 2 for server status 218 indicates that server 210 is very busy. In addition to indicating that server 210 cannot serve as a secondary server; the server status 218 of 2 also indicates that service gateway 110 should apply a restriction prior to selecting server 210 to process a new service request as a primary server. For example, if service gateway 110 receives service request 301 with a request URL 311, service gateway 110 applies restriction prior to selecting server 210 to process service request 301. The restriction will be explained in further details with reference to FIG. 4.

Figure 4:
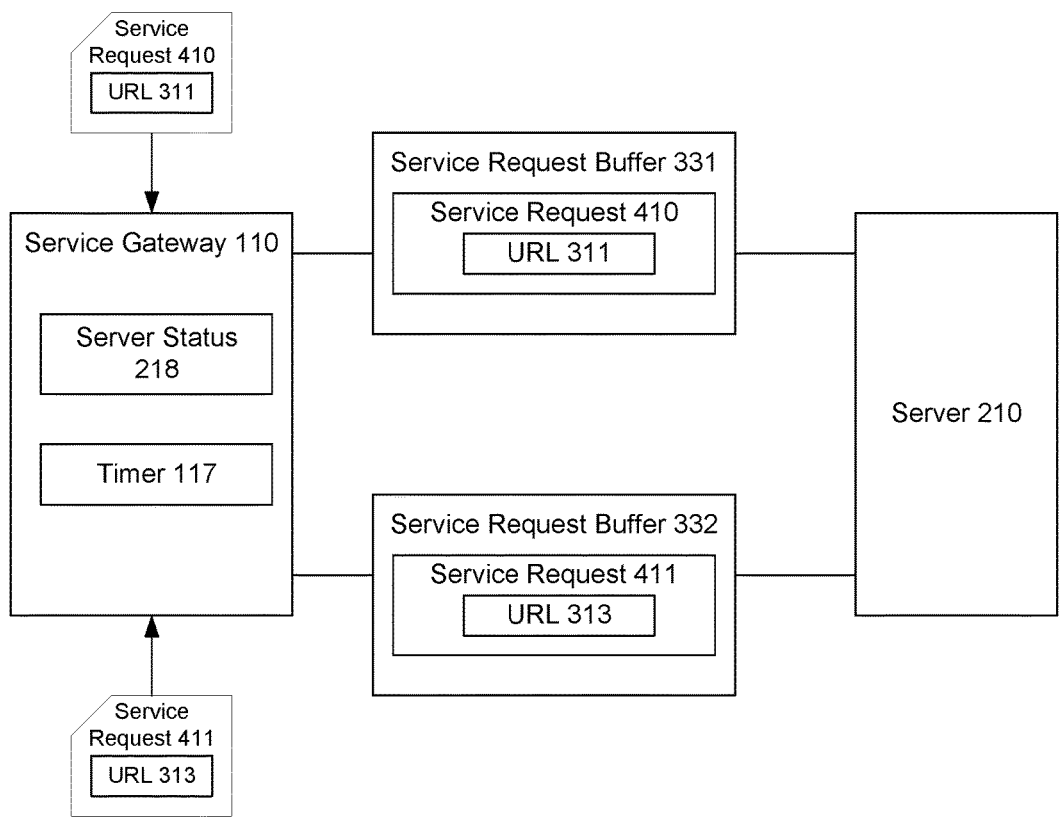
FIG. 4 is a block diagram illustrating an embodiment of the processing of service requests by the service gateway after receiving server status.

FIG. 4 is a block diagram illustrating an embodiment of the processing of service requests by the service gateway 110 after receiving server status 218. In one embodiment, service gateway 110 includes a service request buffer 331. Service request buffer 331 is configured to store service requests with request URL 311. In an embodiment, server 210 is configured as a primary server for URL 311 and as a secondary server for request URL 313. Service gateway 110 further includes service request buffer 332, which is configured to store service requests with request URL 313. In an example, service request buffer 332 includes service request 411 with request URL 313.

Service gateway 110 received server status 218 from server 210 in a service response to a previous service request according to FIG. 2 above. Referring to FIGS. 4 and 7, the service gateway 110 receives a next service request 410 from the host 100 (704). The service gateway 110 stores the service request 410 with request URL 311 in service request buffer 331 and processes service request 410 in service request buffer 331 according the value of server status 218.

In one embodiment, server status 218 has a value of 0, indicating server 210 is "not busy". Service gateway 110 examines (first) service request buffer 331 and finds service request 410 with (first) request URL 311 for which server 210 is configured as the primary server (705). Service gateway 110 selects server 210 and sends service request 410 to server 210 (707). In one embodiment, service request buffer 331 is empty when service gateway 110 receives the next service request with request URL 311. The service gateway 110 sends this service request to server 210 without placing it in the service request buffer 331.

In this embodiment with server status 218 of value 0, service gateway 110 examines (second) service request buffer 332 and finds service request 411 with (second) request URL 313 for which server 210 is configured as the secondary server (706). As server status 218 indicates server 210 is available to serve as a secondary server, service gateway 110 may select server 210 to process service request 411 (711).

In one embodiment, request buffer 332 is empty when service gateway 110 receives the next server request which includes request URL 313. Service gateway 110 may select server 210 to process this service request without placing it in the service request buffer 332.

In one embodiment, server status 218 has a value or 1, indicating server 210 is busy and is not available to serve as a secondary server for URL 313 but is available to serve as a primary server. Service gateway 110 examines service request buffer 331. In one embodiment, service gateway 110 finds service request 410 in service request buffer 331 (705). Service gateway 110 sends service request 410 to server 210 (708). In one embodiment, service request buffer 331 is empty when service gateway 110 receives the next service request which includes request URL 311. Service gateway 110 sends this service request to server 210 without placing it in service request buffer 331.

In this embodiment with server status 218 of value 1, service gateway 110 examines service request buffer 332 and finds service request 411 in service request buffer 332 (706). Service gateway 110 does not select server 210 to process service request 411 (712). Instead, the service gateway 110 may select another server in the server pool 200 to process the service request 411 (713). In one scenario, the service request buffer 332 is empty when the service gateway 110 receives the next service request which includes request URL 313. Service gateway 110 does not select server 210 to service request (712).

In one embodiment server status 218 is of value 2, indicating server 210 is "very busy". In this embodiment, server 210 is not capable of serving as a secondary server to URL 313 but may serve as a primary server with restrictions.

In this embodiment with server status 218 of value 2, service gateway 110 examines service request buffer 331 and finds service request 410 (705). Service gateway 110 does not automatically send request 410 to server 210. In one embodiment, service gateway 110 includes a timer 117. Service gateway 110 waits for the timer 117 to expire (709) before selecting server 210 and sending request 410 to server 210 (710). In one embodiment, service gateway 110 configures timer 117 after receiving service response 321 with server status 218 of value 2. Timer 117 may be configured for duration of, for example 1 minute, 30 seconds, 1 second, 400 milliseconds, 5 milliseconds, 300 microseconds, or any other duration such that service to service request 410 is not severely affected. In one embodiment, timer 117 duration is based on the session protocol time out duration for service request 410.

In one embodiment with server status 218 of value 2, service request buffer 331 is empty when service gateway 110 receives a next service request with request URL 311. Service gateway 110 stores this service request in service request buffer 331. At a later time when timer 117 expires, service gateway 110 examines service request buffer 331 and finds this service request (705). When the timer 117 expires (709), service gateway 110 selects the server 210 and sends this service request to server 210 (710). In one embodiment, service gateway 110 sets up timer 117 again after processing service request buffer 331. In one embodiment, service gateway 110 processes a plurality of requests in service request buffer 331 before setting timer 117 again. In one embodiment, service gateway 110 cancels timer 117 when service gateway 110 receives server status 218 of value 0 or 1.

In this embodiment with server status 218 of value 2, service gateway 110 examines service request buffer 332 and finds service request 411 in service request buffer 332

(706). Service gateway 110 does not select server 210 to process service request 411 (714). Instead, the service gateway 110 may select another server in the server pool 200 to process the service request 411 (713). In one embodiment, the service request buffer 332 is empty when the service gateway 110 receives the next service request which includes request URL 313. Service gateway 110 does not select server 210 to service the service request.

Figure 5:
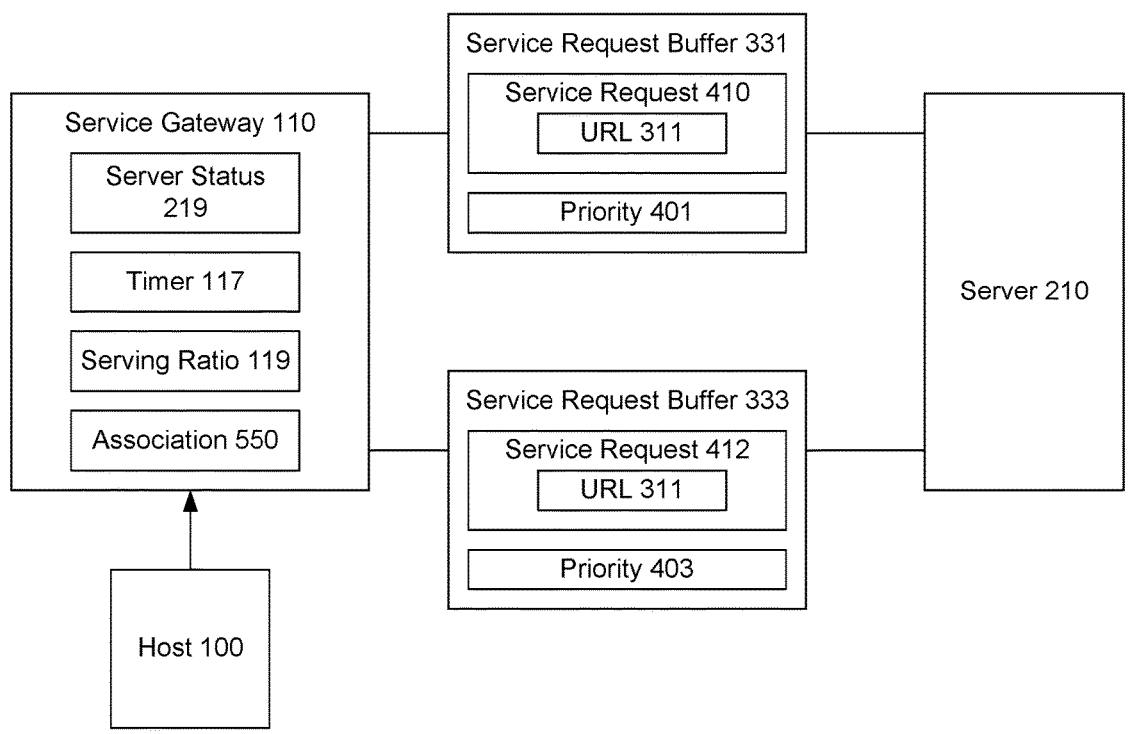
FIG. 5 illustrates the service gateway processing the service request according to service priorities.

FIG. 5 illustrates the service gateway 110 processing the service request according to service priorities. Service priorities may be configured based on a variety of parameters, such as the request URL of the service request, the host from which the service request is sent, and the data network where service gateway 110 receives the service request. In one embodiment, the service priority association 550 between a priority and the parameter value is stored in service gateway 110. For example, priority 401 is associated with URL 311, and the association 550 between priority 401 and URL 311 is stored in service gateway 110. In another example, priority 401 is associated with host 100, such as the IP address of host 100 or the user identity of host 100, and the association 550 between the priority 401 and the host 100 is stored in service gateway 110. In another example, priority 401 is associated with the network interface from which service request 410 is received, and the association 550 between the priority 401 and the network interface is stored in service gateway 110. In one embodiment, service gateway 110 includes a datastore (not shown) storing the association 550. Service gateway 110 determines priority 401 for the service request 410 by matching the appropriate parameter of the service request 410 to the stored association 550.

In one embodiment, service gateway 110 includes service request buffer 333 configured to store service requests with request URL 311, and service request buffer 331 also configured to store service requests for URL 311. Service request buffer 333 is configured to store service requests with priority 403, which is higher than priority 401. Service request buffer 331 is configured to store service requests with priority 401. In one embodiment, the server status 218 has a value of 2, and service gateway 110 stores service request 410 with request URL 311 and priority 401 in service request buffer 331. Service gateway 110 further receives a service request 412 with request URL 311 and service priority 403. Service gateway 110 stores service request 412 in service request buffer 333.

When the timer 117 expires, service gateway 110 examines service request buffer 333 of higher priority 403 before examining service request buffer 331 of lower priority 401. In this example, service gateway 110 processes service request 410 before processing service request 412.

In one embodiment, service gateway 110 receives a new server status 219 for server 210 of value 0 or 1, and service gateway 110 continues to examine service request buffer 333 of higher priority 403 before examining service request buffer 331 of lower priority 401. In this example, service gateway 110 processes service request 412 before processing service request 410.

In one embodiment, service gateway 110 processes all service requests from service request buffer 333 before processing service request buffer 331, regardless of the value of the server status 218. In one embodiment, service gateway 110 includes a serving ratio 119 where service gateway 110 processes service requests in service request buffer 333 and service request buffer 331 according to ratio 119, where ratio 119 favors the higher priority service request buffer 333 to the lower priority service request buffer 331 in order to avoid starving the lower priority service requests in service request buffer 331.

Figure 6:
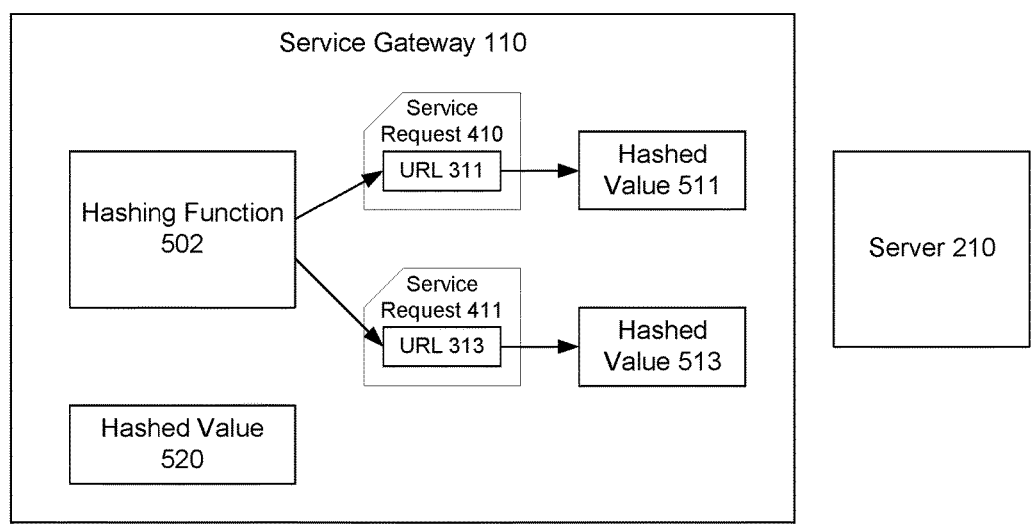
FIG. 6 illustrates an embodiment of processing service requests by the service gateway 110.

In a preferred embodiment, server 210 is configured to serve as primary server for a plurality of URLs. FIG. 6 illustrates an embodiment of processing service requests by the service gateway 110. In one embodiment, a hashing function 502 is applied to URL 311 and URL 313. When hashing function 502 is applied to URL 311, the result is a hashed value 511. Similarly, when hashing function 502 is applied to URL 313, the result is a hashed value 513. In one embodiment, Server 210 is configured to serve as primary server for hashed value 520. In one embodiment, service gateway 110 stores hashing function 502 and hashed value 520. Examples for hashing function 502 include MD5 (Message-Digest algorithm 5) hashing function, a Jenkins hashing function, a hashing function applicable for a sequence of characters, or a hashing function for table lookup.

When service gateway 110 receives service request 410 with request URL 311. Service gateway 110 applies hashing function 502 to request URL 311 to yield hashed value 511. Service gateway 110 compares hashed value 511 to hashed value 520. If hashed value 511 matches hashed value 520, service gateway 110 selects server 210 to process service request 410 in the manner described above. In one embodiment, service gateway 110 receives service request 411 with request URL 313. Service gateway 110 applies hashing function 502 to request URL 313 to yield hashed value 513. Service gateway 110 compares hashed value 513 to hashed value 520. If hashed value 513 matches hashed value 520, service gateway 110 selects server 210 to process service request 411. In one embodiment, hashed value 513 does not match hashed value 520, and service gateway 110 does not automatically select server 210.

In one embodiment, server 210 is configured as a secondary server to hashed value 513. Service gateway 110 may select server 210. In one embodiment, server 210 is not configured to serve hashed value 513, and service gateway 110 does not select server 210 to process service request 411.

In this embodiment, service gateway 110 applies hashing function 502 to a service request when service gateway 110 processes the service request. Once the service gateway 110 determines that the server 210 is configured either as the primary or the secondary server to the hashed value 513, the service gateway 110 processes the service request 411 using the server status 218 as described above. One of ordinary skill in the art will understand how to combine the application of the hashing function to the process described above without departing from the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for balancing servers by a service gateway comprising:
   receiving, by the service gateway, a first service request from a host, the service request including a first Uniform Resource Locator (URL) associated with at least one server of a plurality of servers, each URL of URLs being individually resolved to a primary server configured to process the URL and a secondary server configured to process the URL, each server of the plurality of servers being configured as one of primary servers and one of secondary servers for different URLs such that any given server resolves as a primary server for a first given URL and resolves as a secondary server for a second given URL, the service gateway being configured to automatically select, for each URL of the URLs, the primary server configured to process the URL for processing service requests associated with the URL;

determining that a first server is the primary server configured to process the first URL and a second server is the secondary server configured to process the first URL;

based on the determining that the first server is the primary server, selecting the primary server associated with the first URL to process the first service request;

receiving a service response from the primary server, the service response including a server status indicating a computing load status of the primary server;

obtaining the server status from the service response; and using the server status from the service response to determine whether the first server is available to process a second service request including a URL associated with at least one server.

2. The method of claim 1, wherein the using the server status from the service response to determine whether the first server is available to process a second service request including a URL associated with at least one server comprises:

determining that the server status indicates the first server is not busy;

determining the second service request includes a second URL associated with the first server as the primary server to process the URL; and in response to determining the first server is not busy and the second service request includes a second URL associated with the first server as the primary server, selecting the primary first server to process the second service request.

3. The method of claim 1, wherein the using the server status from the service response to determine whether the first server is available to process a second service request including a URL associated with at least one server comprises:

determining that the server status indicates the first server is busy;

determining the second service request includes a second URL associated with the first server as the primary server to process the URL; and in response to determining the first server is busy and the second service request includes a second URL associated with the first server as the primary server, selecting the first server to process the second service request.

4. The method of claim 1, wherein the using the server status from the service response to determine whether the first server is available to process a second service request including a URL associated with at least one server comprises:

determining that the server status indicates the first server is busy;

determining the second service request includes a second URL associated with the first server as the secondary server to process the URL; and in response to determining the first server is busy and the second service request includes a second URL associated with the first server as the secondary server, selecting a different server to process the second service request.

5. The method of claim 1, wherein the using the server status from the service response to determine whether the first server is available to process a second service request including a URL associated with at least one server comprises:

determining that the server status indicates the first server is very busy;

determining the second service request includes a second URL associated with the first server as the primary server to process the URL;

in response to determining the first server is very busy and the second service request includes a second URL associated with the first server, configuring a timer for a duration; and in response to the expiration of the timer, selecting the first server to process the second service request.

6. The method of claim 1, wherein the obtaining the server status from the service response comprises:

locating a server status in the service response;

removing the server status from the service response; and sending a modified service response to the host.

7. The method of claim 1, wherein the service response is at least one of an HTTP response and an XML document.

8. The method of claim 1 wherein the service response is at least one of an SIP packet and an FTP response.

9. A non-transitory computer readable storage medium having embodied thereon instructions, the instructions being executable by a processor to perform a method for balancing servers, the method comprising:

receiving, by the service gateway, a first service request from a host, the service request including a first Uniform Resource Locator (URL) associated with at least one server of a plurality of servers, each URL of URLs being individually resolved to a primary server configured to process the URL and a secondary server configured to process the URL, each server of the plurality of servers being configured as one of primary servers and one of secondary servers for different URLs such that any given server resolves as a primary server for a first given URL and resolves as a secondary server for a second given URL, the service gateway being configured to automatically select, for each URL of the URLs, the primary server configured to process the URL for processing service requests associated with the URL;

determining that a first server is the primary server configured to process the first URL and a second server is the secondary server configured to process the first URL;

based on the determining that the first server is the primary server, selecting the primary server associated with the first URL to process the first service request;

receiving a service response from the primary server, the service response including a server status indicating a computing load status of the primary server;

obtaining the server status from the service response; and using the server status from the service response to determine whether the first server is available to process a second service request including a URL associated with at least one server.

10. The non-transitory computer readable storage medium of claim 9, wherein the using the server status from the service response to determine whether the first server is available to process a second service request including a URL associated with at least one server comprises:
- determining that the server status indicates the first server is not busy;
- determining the second service request includes a second URL associated with the first server as the primary server to process the URL; and
- in response to determining the first server is not busy and the second service request includes a second URL associated with the first server as the primary server, selecting the primary first server to process the second service request.

11. The non-transitory computer readable storage medium of claim 9, wherein the using the server status from the service response to determine whether the first server is available to process a second service request including a URL associated with at least one server comprises:
- determining that the server status indicates the first server is busy;
- determining the second service request includes a second URL associated with the first server as the primary server to process the URL; and
- in response to determining the first server is busy and the second service request includes a second URL associated with the first server as the primary server, selecting the first server to process the second service request.

12. The non-transitory computer readable storage medium of claim 9, wherein the using the server status from the service response to determine whether the first server is available to process a second service request including a URL associated with at least one server comprises:
- determining that the server status indicates the first server is busy;
- determining the second service request includes a second URL associated with the first server as the secondary server to process the URL; and
- in response to determining the first server is busy and the second service request includes a second URL associated with the first server as the secondary server, selecting a different server to process the second service request.

13. The non-transitory computer readable storage medium of claim 9, wherein the using the server status from the service response to determine whether the first server is available to process a second service request including a URL associated with at least one server comprises:
- determining that the server status indicates the first server is very busy;
- determining the second service request includes a second URL associated with the first server as the primary server to process the URL;
- in response to determining the first server is very busy and the second service request includes a second URL associated with the first server, configuring a timer for a duration; and
- in response to the expiration of the timer, selecting the first server to process the second service request.

14. The non-transitory computer readable storage medium of claim 9, wherein the obtaining the server status from the service response comprises:
- locating a server status in the service response;
- removing the server status from the service response; and
- sending a modified service response to the host.

15. A system comprising: a processor; and a memory coupled to the processor, the memory storing instructions, the instructions being executable by the processor to perform a method for balancing servers, the method comprising:
- receiving, by the service gateway, a first service request from a host, the service request including a first Uniform Resource Locator (URL) associated with at least one server of a plurality of servers, each URL of URLs being individually resolved to a primary server configured to process the URL and a secondary server configured to process the URL, each server of the plurality of servers being configured as one of primary servers and one of secondary servers for different URLs such that any given server resolves as a primary server for a first given URL and resolves as a secondary server for a second given URL, the service gateway being configured to automatically select, for each URL of the URLs, the primary server configured to process the URL for processing service requests associated with the URL;
- determining that a first server is the primary server configured to process the first URL and a second server is the secondary server configured to process the first URL;
- based on the determining that the first server is the primary server, selecting the primary server associated with the first URL to process the first service request;
- receiving a service response from the primary server, the service response including a server status indicating a computing load status of the primary server;
- obtaining the server status from the service response; and
- using the server status from the service response to determine whether the first server is available to process a second service request including a URL associated with at least one server.

16. The system of claim 15, wherein the using the server status from the service response to determine whether the first server is available to process a second service request including a URL associated with at least one server comprises:
- determining that the server status indicates the first server is not busy;
- determining the second service request includes a second URL associated with the first server as the primary server to process the URL; and
- in response to determining the first server is not busy and the second service request includes a second URL associated with the first server as the primary server, selecting the primary first server to process the second service request.

17. The system of claim 15, wherein the using the server status from the service response to determine whether the first server is available to process a second service request including a URL associated with at least one server comprises:
- determining that the server status indicates the first server is busy;
- determining the second service request includes a second URL associated with the first server as the primary server to process the URL; and
- in response to determining the first server is busy and the second service request includes a second URL associated with the first server as the primary server, selecting the first server to process the second service request.

18. The system of claim 15, wherein the using the server status from the service response to determine whether the first server is available to process a second service request including a URL associated with at least one server comprises:
- determining that the server status indicates the first server is busy;
- determining the second service request includes a second URL associated with the first server as the secondary server to process the URL; and
- in response to determining the first server is busy and the second service request includes a second URL associated with the first server as the secondary server, selecting a different server to process the second service request.

19. The system of claim 15, wherein the using the server status from the service response to determine whether the first server is available to process a second service request including a URL associated with at least one server comprises:
- determining that the server status indicates the first server is very busy;
- determining the second service request includes a second URL associated with the first server as the primary server to process the URL;
- in response to determining the first server is very busy and the second service request includes a second URL associated with the first server, configuring a timer for a duration; and
- in response to the expiration of the timer, selecting the first server to process the second service request.

20. The system of claim 15, wherein the obtaining the server status from the service response comprises:
- locating a server status in the service response;
- removing the server status from the service response; and
- sending a modified service response to the host.

* * * * *